(12) United States Patent
Wilcox et al.

(10) Patent No.: US 6,296,770 B1
(45) Date of Patent: Oct. 2, 2001

(54) CONSTANT CONCENTRATION AT THE UF MEMBRANE WALL UF PROCESS CONTROL AND APPARATUS

(75) Inventors: Margaret B. Wilcox; William R. Gately; Raymond F. Hall, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/458,553

(22) Filed: Dec. 9, 1999

(51) Int. Cl.[7] ..................................................... B01D 61/00

(52) U.S. Cl. ..................... 210/651; 210/650; 210/195.2; 430/30; 430/567; 430/569

(58) Field of Search ....................................... 210/651, 650, 210/195.2, 641; 430/567, 30, 569

(56) References Cited

U.S. PATENT DOCUMENTS

| | | |
|---|---|---|
| 5,164,092 | 11/1992 | Munch . |
| 5,242,597 * | 9/1993 | McArdle . |
| 5,248,418 * | 9/1993 | Munch . |
| 5,256,294 | 10/1993 | van Reis . |
| 5,270,159 * | 12/1993 | Ichikawa et al. ..................... 430/569 |
| 5,490,937 | 2/1996 | van Reis . |
| 5,693,229 * | 12/1997 | Hartmann . |

* cited by examiner

Primary Examiner—Ana Fortuna
(74) Attorney, Agent, or Firm—Mark G. Bocchetti

(57) ABSTRACT

A method and apparatus for ultrafiltration, washing and concentration of photographic emulsion uses the Blatt Stagnant Film Theory using a gelatin-based mass transfer coefficient of the feed, gelatin concentration of the feed and a setpoint of a constant concentration at the ultrafiltration membrane wall. A useful permeate flow is achieved by varying the pump speed and membrane pressures.

6 Claims, 11 Drawing Sheets

CONSTANT CONCENTRATION AT THE UF MEMBRANE WALL UF PROCESS CONTROL AND APPARATUS

FIELD OF THE INVENTION

The present invention relates generally to the reproducible separation and purification of photographic emulsions from mixtures containing photographic emulsion combined with impurities such as low molecular weight gelatins, salts, and other addenda added in the previous batch process step. More particularly, the present invention relates to methods utilizing spiral wound ultrafiltration (UF) for achieving the aforementioned while reducing yield loss and additive variability and in addition reducing equipment stress in ultrafiltration processes is addressed.

BACKGROUND OF THE INVENTION

In U.S. Pat. No. 5,256,294, titled "TANGENTIAL FLOW FILTRATION PROCESS AND APPARATUS," by Robert D. van Reis, et al., Oct. 26, 1993, and U.S. Pat. No. 5,490,937, titled "TANGENTIAL FLOW FILTRATION PROCESS AND APPARATUS," by Robert D. van Reis, et al., Feb. 13, 1996, a system for concentrating and washing proteins is described that employs cassette-type (similar to plate-and-frame) ultrafiltration membranes of various decreasing sizes for separating protein mixtures while maintaining a flux ranging from 5% to 100% of transition flux. Transmembrane pressure is maintained substantially consistent along the length of the membrane at a level no greater than the transition flux. A backpressure control valve is used on the permeate flow such that a constant pump speed is maintained while the permeate flow can dictate a constant concentration of material to be retained at the wall of the membrane. In this way, a vast reduction of the concentration polarization layer allows for more consistent purification of the proteins. The disadvantages in these methods are that they are not proven for spiral wound confirmation, an additional control valve is required for the permeate and the pump speed and pressure on the modules are not reduced.

In U.S. Pat. No. 5,164,092, titled "2-STAGE ULTRA-FILTRATION PROCESS FOR PHOTOGRAPHIC EMULSIONS," by William D. Munch, Nov. 17, 1992, a two-stage system for concentrating and washing photographic emulsions to high viscosities is described that employs spiral wound ultrafiltration as the first stage. Plate-and-frame (of which cassettes are a variety) ultrafiltration is the second stage. Although the goal of further concentrating emulsions to appropriate curtain-coating levels achieved by the combination of the ultrafiltration module designs, first batch yield losses and yield variability was not addressed. These are important due to the cost of lost product in lost yield which, in this case, occurs only in the first batch after a chemical cleaning. Furthermore, since it only occurs on a first batch after a chemical cleaning, the yield will be lower for that batch than for the one to seven additional batches that follow before the next chemical cleaning. Since up to 50 additional chemicals can be added in the downstream batch process, the variability in the yield can lead to manually having to cut the amounts of those 50 chemicals depending on the yield. If the yield were dependably high, computer generated amounts of chemicals could be added in the downstream batch process at a constant amount for each batch. Without a dependably high yield it is necessary to manually adjust depending on the yield variability. These issues were not addressed since the traditional process control strategy was used. This process employs the much-used process control strategy of a positive displacement pump operating at constant, relatively high speed. The pump speed control is nested with a feed flow backpressure control valve. Together, the pump speed, which is approximately 300 rpm, and feed backpressure control in the process result in a relatively high feed inlet pressure setpoint. In this scheme, transmembrane pressure for the filtration is maintained along the membrane substantially higher than the transmembrane pressure at the transition point of the filtration.

The resulting concentration polarization layer build up prevents concentration to levels required in certain applications. Thus, the additional concentration apparatus, i.e. the plate-and-frame UF module is required to achieve the target concentrations with the addition of considerable process time due to the severely reduced surface area of the plate-and-frame arrangement.

SUMMARY OF THE INVENTION

A novel process control process for UF washing and concentration (of photographic emulsions) results in increased first batch yield and reduced yield variability, and finally reduced stress on the following process equipment and components: feed pumps, UF membranes, and back pressure control valves. Reduced stress on process components is typified by 20% lower pump speed for $C_{wall}$ (constant concentration at the UF membrane wall) batches; 4% lower pump speed overall; 19% reduction in use of feed backpressure control valves; 40% reduced tube pressure on $C_{wall}$ batches, and 8% reduced tube pressure overall.

The process control strategy does not require additional equipment (plate-and-frame UF) and uses the Blatt Stagnant Film Theory. The controlling algorithm uses a predetermined, gel-based mass transfer coefficient of the feed, the gelatin concentration of the feed, and a $C_{wall}$ setpoint wherein;

$$PFR = kLN\ (C_{wall}/C_{bulk})$$

Where

PFR=Permeate flow rate in L/m² hr k=mass transfer coefficient in L/m² hr $C_{wall}$=Concentration of gel at wall of membrane in wgt/vol % gel $C_{bulk}$=Concentration of gel in bulk solution in wgt/vol %=$V_0 C_0/V$ $V_0$=volume at time=0 in L V=volume at time=t in L $C_0$=concentration of gel at time=0 in wgt/vol %

The $C_{wall}$ setpoints are derived from the Blatt Stagnant Film Theory. Through experimentation, it was determined that the mass transfer coefficient (k) is controlled largely by the gelatin in the silver halide emulsions and not by the silver halide grains.

FIG. 1 demonstrates how the permeate flowrate of a traditionally processed batch of emulsion is regressed against the wgt/vol % gelatin during the initial concentration step. The negative of the slope of a line is the mass transfer coefficient (k). The initial $C_{wall}$ setpoint can be determined using the following equation:

$$C_{wall}\text{setpoint} = e^{(y\ intercept/k)}$$

In this application, the backpressure control valve is used, when necessary, on the feed flow, while an algorithm based on the Blatt Stagnant Film Theory is used to control the concentration polarization layer retained at the wall of the membrane (spiral wound configuration in this case). This is achieved by adjusting the pump speed to attain the permeate flow rate required. The operating range of inlet and outlet pressures for each tube of membranes is reduced while at the same time the pressure differential is increased. The resulting increased feed flow aids in reducing the concentration polarization layer retained at the wall of the membrane.

The $C_{wall}$ (Constant Concentration at the UF Membrane Wall) UF process control operates usually without a back pressure control valve, and at lower pump speeds (such as 258 rpm to 324 rpm with the average being 275 rpm) that vary according to the required permeate flow. The membrane module inlet and outlet pressures, both variable, are lower for most of the process. Thus, in addition to better yield and reduced yield variability, there is reduced stress on the process equipment due to the lower pump speeds and operating pressures.

DETAILED DESCRIPTION OF THE INVENTION

Figure 2:
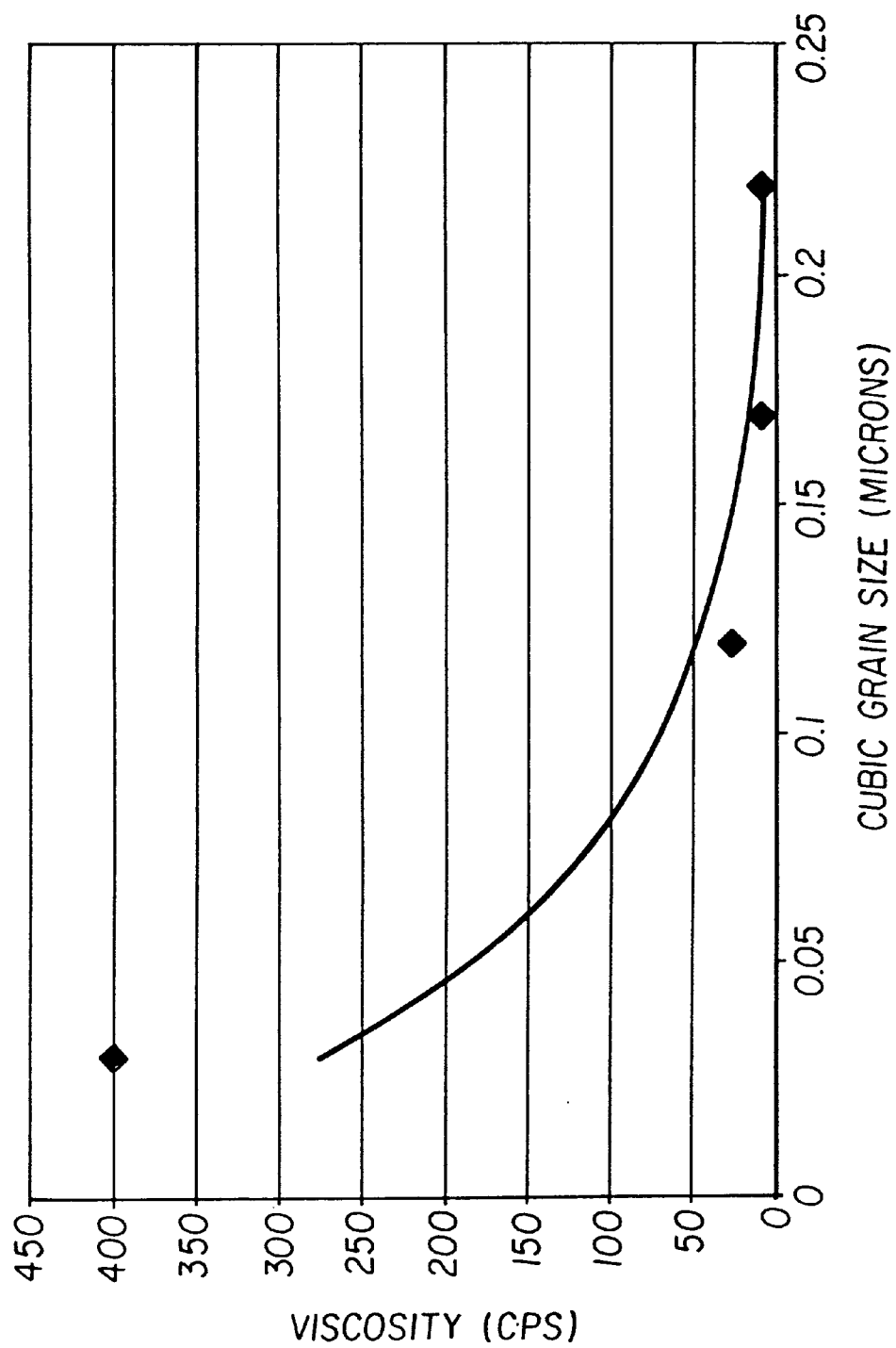
FIG. 2 is a graph of the change in viscosity in centipoise as a function of cubic emulsion grainsize (diameter) measured in microns.

Turning to FIG. 2, a graph is shown depicting that the higher viscosities of the finer grain emulsions which exacerbate the adhesion losses of emulsion on UF membrane using the current process control strategy. This is particularly true on fine-grained cubic emulsions (i.e. 0.3 microns mean diameter or less).

Figure 3:
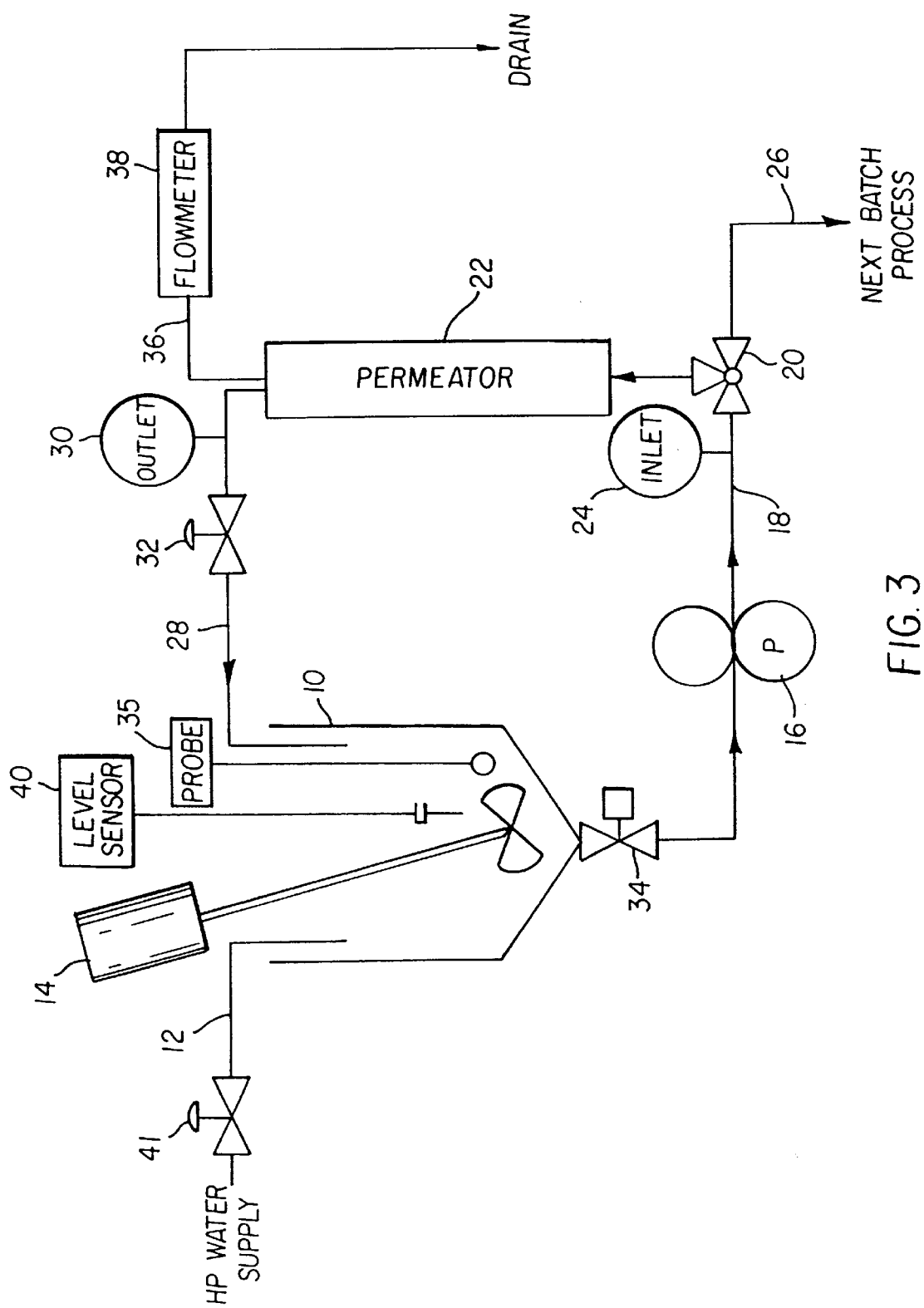
FIG. 3 is a schematic view of the system of the present invention.

Looking next at FIG. 3 there is shown a schematic of a system of the present invention for emulsion ultrafiltration (UF). In this embodiment, photographic emulsion comprising water, gelatin molecules having a wide range in molecular weight (e.g. 250–1,000,000), ions or ripeners of low molecular weight (e.g. 10–400), and silver halide grains (0.05 to 10.00 microns in diameter) are added to a reaction vessel 10 which is separate from the silver halide reaction vessel (not shown). Water enters vessel 10 by a conduit 12. The concentration of the silver halide can then begin in the vessel 10 in a batch mode while the production of the silver halide is still occurring. There is a mixer 14 in vessel 10, which is not used until the very end of the process as will be described hereinafter.

Membrane diafiltration has long been a standard procedure in production for removing salts and reducing water content of emulsions. The downstream batch process determines the degree of removal of salts and water from the emulsions. For most emulsions, results are acceptable using spiral wound UF membranes. For some very fine-grain formulations, silver accumulates in the membranes, leading to unacceptable variability and waste. The models used for development of $C_{wall}$ emulsion formula are explained using the Blatt Stagnant film theory and the emulsion process data.

Traditionally, prior art UF has been run using TMP (transmembrane pressure) control. The photographic emulsion, referred to as feed, is pumped from the reaction vessel using a feed pump. Feed pump speed and inlet pressure to the UF spiral wound membranes are kept constant using setpoints throughout the initial concentration, a constant volume wash, and final concentration(s). The process is controlled to an inlet pressure setpoint in the relatively high pressure range (100–125 psi). The prior art UF process equipment is operating in the pressure independent regime during TMP, meaning further increase in pressure will not improve the performance significantly. Coincidentally, this is a desirable process condition under which to measure the mass transfer coefficient. During the final concentration, water and air are used to reclaim feed from the piping and the UF permeators. It is possible to measure the residual feed remaining on the UF membranes after the batch process using the Destructive Permeator test.

TMP (prior art) results in a $1^{st}$ batch yield effect for cubic emulsions with a grain size of 0.3 microns or less. Loss of yield on viscous, fine grain 1st batches, due to adhesion of the emulsion to the membrane can be as high as 3% for a 0.06 microns emulsion. Non-$1^{st}$ batch yield losses are minimal (about 0.01%). The variability on feeds exhibiting the $1^{st}$ batch yield effect is higher than products not exhibiting it. This causes additional preparation for the next batch process, which involves chemical and spectral sensitization of the feed since levels of the additional materials must be adjusted according to the yield.

Returning to FIG. 3, feed is pumped from the reaction vessel 10 via pump 16 through conduit 18, three-way valve 20 and into permeator 22 which contains the spiral wound UF membranes. There is an inlet pressure sensor 24 in conduit 18 to ensure that the UF membranes are not damaged. A conduit 26 exiting three-way valve 20 is present to allow concentrate to be sent to the next batch process (not shown) at the completion of the batch run of the process of the present invention. There is a concentrate line 28 exiting permeator 22 which includes therein a pressure sensor 30 and a back pressure control valve 32. Concentrate is recycled to the reaction vessel 10 via conduit 28 when valve 34 is open. The concentration level endpoint as measured by the level sensor 40 is determined by the requirements of the downstream batch process (not shown). There is a conductivity probe 35 in reaction vessel 10 to determine wash endpoint conductivity. The wash endpoint conductivity is determined by the requirements of the downstream batch process (not shown). Also exiting permeator 22 is permeate conduit 36 which has installed therein flowmeter 38. Permeate conduit 36 goes to drain.

$C_{wall}$ (Constant Concentration at the Wall of the UF membrane) control uses an algorithm based on the following Blatt Stagnant Film Theory to control the 1st batch yield effect in the UF process with the permeate flow meter 38 as follows:

$$PFR = kLN\ (C_{wall}/C_{bulk})$$

Where

PFR=Permeate flow rate in L/m² hr k=mass transfer coefficient in L/m² hr $C_{wall}$=Concentration of gel at wall of membrane in wgt/vol % gel $C_{bulk}$=Concentration of gel in bulk solution in wgt/vol %=$V_0 C_0/V$ $V_0$=volume at time=0 in L V=volume at time=t in L $C_0$=concentration of gel at time=0 in wgt/vol %

The $C_{wall}$ setpoints are derived from the Blatt Stagnant Film Theory. Through experimentation, it was determined that the mass transfer coefficient is controlled largely by the gelatin in the silver halide emulsions and not by the silver halide grains.

The determination is done using the process data (from the prior art process) for the permeate flow rate and the level (volume). Using the known weight of gelatin, added to the known volume of emulsion (measured using the float style level controller 40) (see FIG. 3), the permeate flowrate (in units of l/m² hour) is regressed against the wt/vol % gelatin for the initial concentration step of the UF process using the traditional TMP control. The resulting straight line with negative slope gives the mass transfer coefficient, k (the inverse slope of the line) (see FIG. 1).

Figure 1:
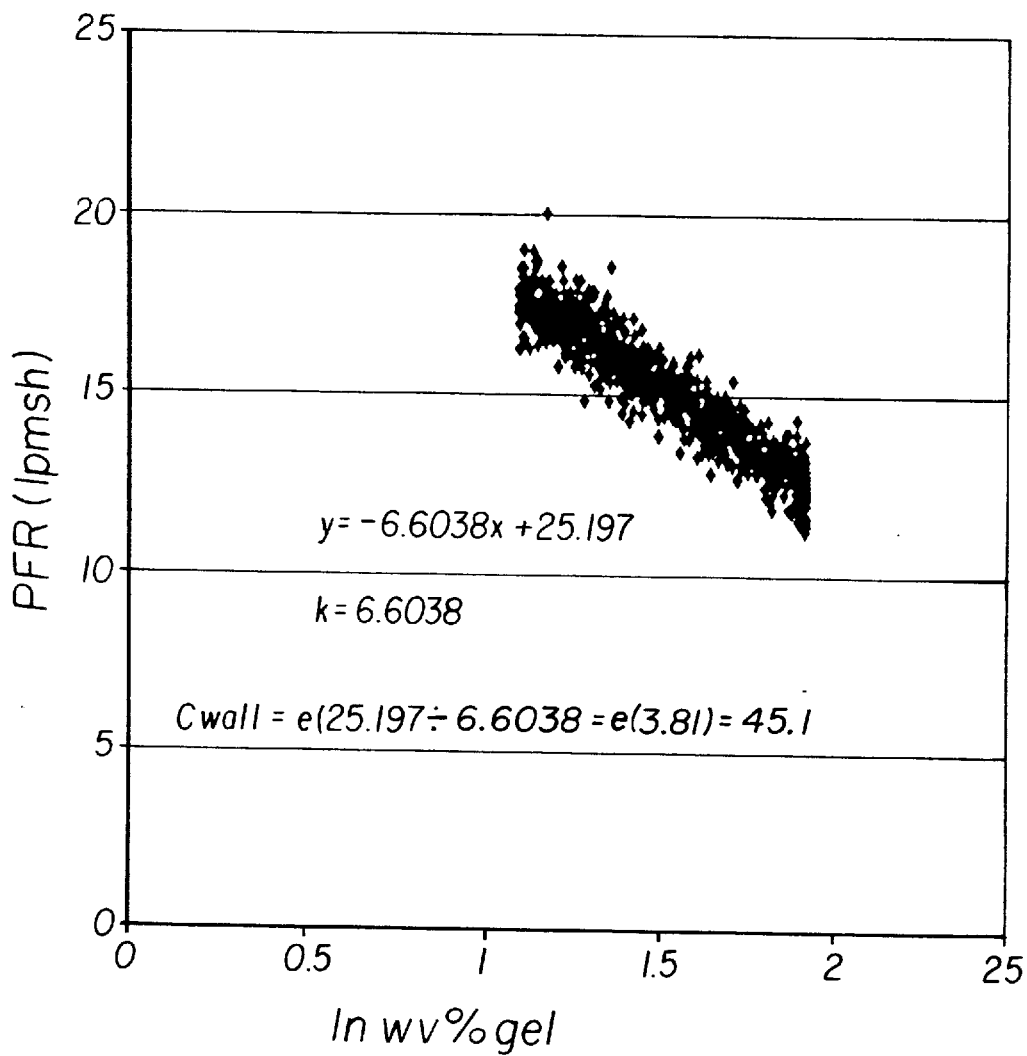
FIG. 1 is an illustration of the use of the Blatt Stagnant Film Theory to determine the mass transfer coefficient (k) and the $C_{wall}$.

The inherent $C_{wall}$ can also be derived since $C_{wall} = e^{(-y\ intercept/k)}$, (See FIG. 1). When the wt/vol % silver halide is used as opposed to the w/v % gelatin, unrealistically high values for the $C_{wall}$ (i.e. 2000 wt/vol % gel) or concentration at the wall of the UF membrane are derived. This is the premise used to indicate gelatin as the controlling element of the mass transfer coefficient.

Using the Blatt Stagnant Film Theory, it is possible to determine the permeate flow rate (in units of l/min) for any number of mass transfer coefficients, (in this case assuming a wt/vol % gel of 3.0).

Figure 4:
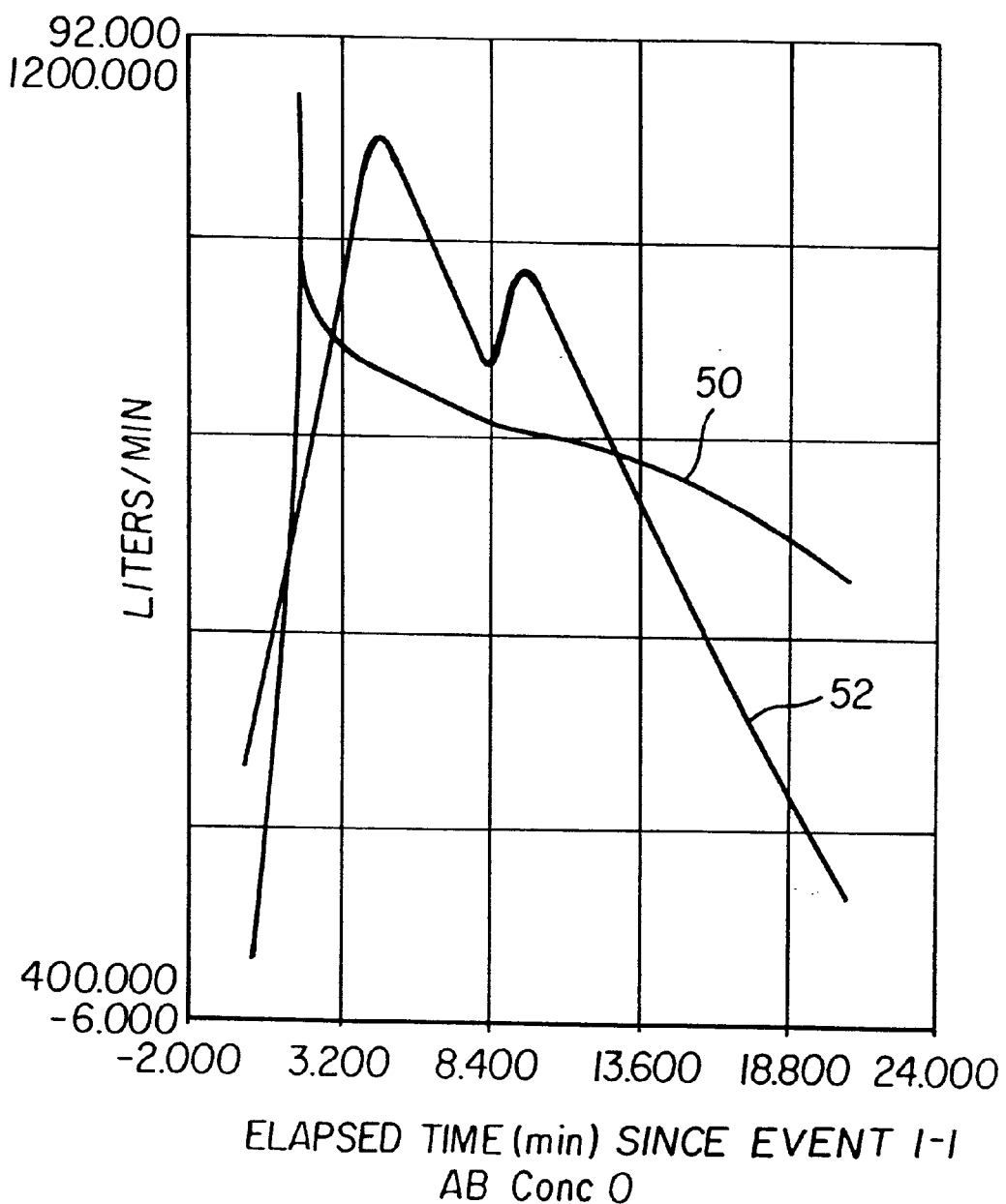
FIG. 4 shows process data of permeate flowrate and level (volume)
Figure 5:
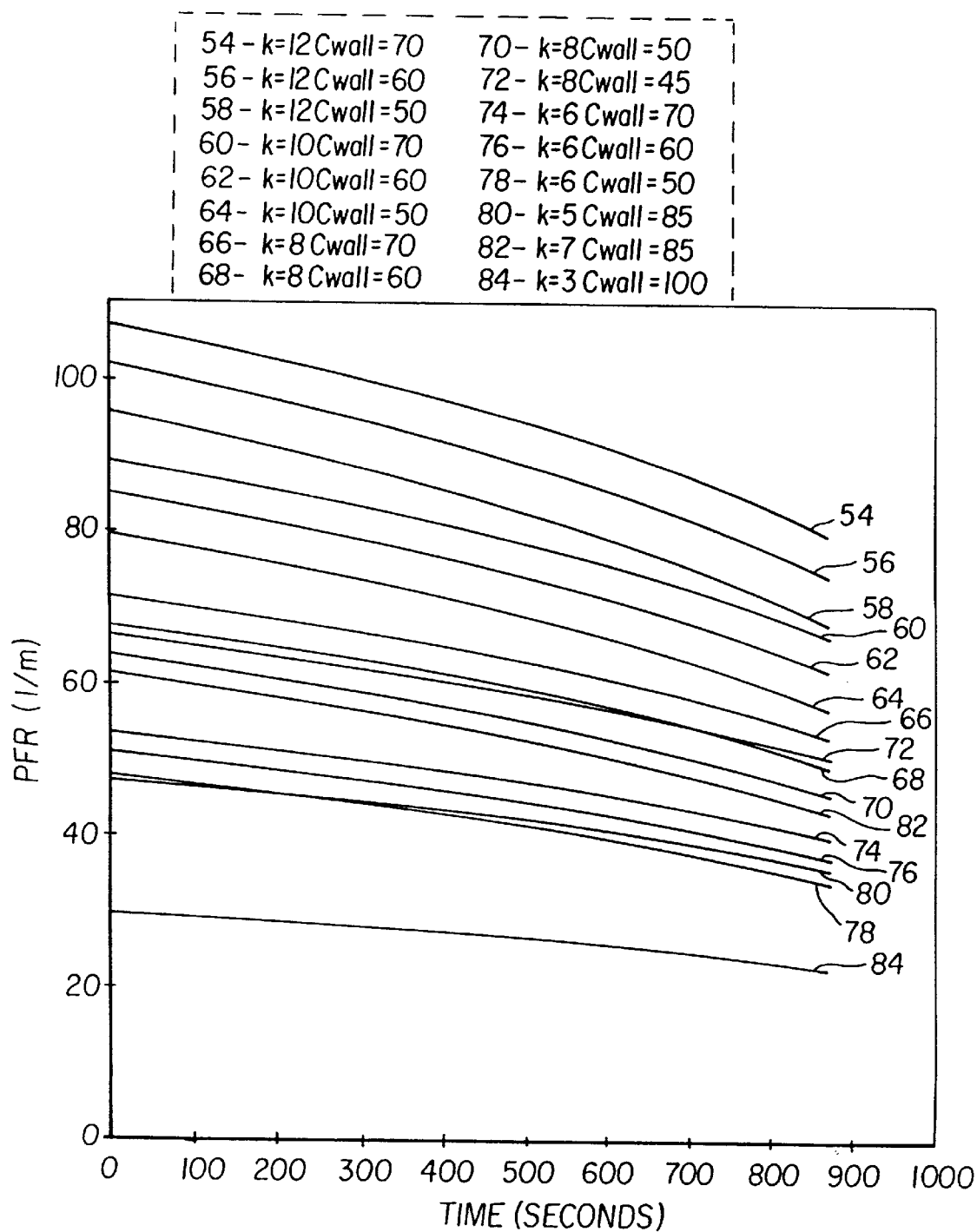
FIG. 5 shows modeled process data for various mass transfer coefficients (k)

The process data (see FIG. 4) for various grain sized emulsions can then be compared to the model of permeate flowrates (see FIG. 5). In FIG. 4, graph line 50 represents permeate flowrate over time. Graph line 52 represents the level of the feed in reaction vessel 10 (in liters). A match of the actual permeate flowrate from the (prior art) TMP process (FIG. 4) to the model (FIG. 5), will indicate an acceptable $C_{wall}$ setpoint to initiate optimization. In FIG. 5 the permeate flowrate (l/min) is plotted over time for a series of various mass transfer coefficients and $C_{wall}$ setpoints. Those permeate flowrates are identified in FIG. 5 as graph lines 54 through 84. A legend is provided in FIG. 5 to identify the mass transfer coefficient and $C_{wall}$ setpoint of each of graph lines 54 through 84.

Once the initial $C_{wall}$ setpoint and the mass transfer coefficient (k) have been determined, the four process setpoints to control the process are now known. Those four process setpoints are $C_{wall}$ mass transfer coefficient (k), level in the reaction vessel, and wash conductivity endpoint.

Feed is transmitted from reaction vessel 10 through valve 34 to pump 16 through valve 20, permeator 22, valve 32 and conduit 28 back to reaction vessel 10. During the concentration phase valve 41 is closed. During the washing phase valve 41 is open and high purity water in the same amount as the permeate measured by flowmeter 38 removed from the process is added. This continues until the wash conductivity endpoint is reached. The $C_{wall}$ control algorithm operates identically during the concentration and wash steps. Based on the feed gel concentration, mass transfer coefficient (k) and $C_{wall}$ setpoint, and the actual and initial levels in reaction vessel 10, a permeate flowrate that the process should operate at, will be determined by the algorithm. This updates whenever the volume in reaction vessel 10 changes by a predetermined amount (e.g. about two percent of the initial volume in reaction vessel 10). The feed pump 16 speed and permeator 22 inlet pressure 24 and outlet pressure 30 will adjust in order to deliver the permeate flowrate determined by the algorithm to achieve the constant $C_{wall}$ setpoint.

To verify improvement in yield, a destructive permeator test is performed as follows:

A baseline TMP $1^{st}$ batch yield effect measurement is taken by removing one tube of new or just chemically cleaned UF permeators after a 1st batch of fine grain cubic emulsion is processed. This measurement determines the baseline residual silver on the UF membrane in mg/ft sq. using ICP-MS (Ion Coupled Plasma Mass Spectroscopy). The permeator sample will be digested in acid, analyzed for silver and compared to a blank of the unused membrane.

After the experimental $C_{wall}$ setpoints are determined and the batch is processed using these setpoints, a $C_{wall}$ $1^{st}$ batch yield effect measurement is taken by removing one tube of new or just chemically cleaned UF permeators after a 1st batch of fine grain cubic emulsion. This measurement determines the new (reduced) level of residual silver on the UF membrane in mg/ft².

Figure 6:
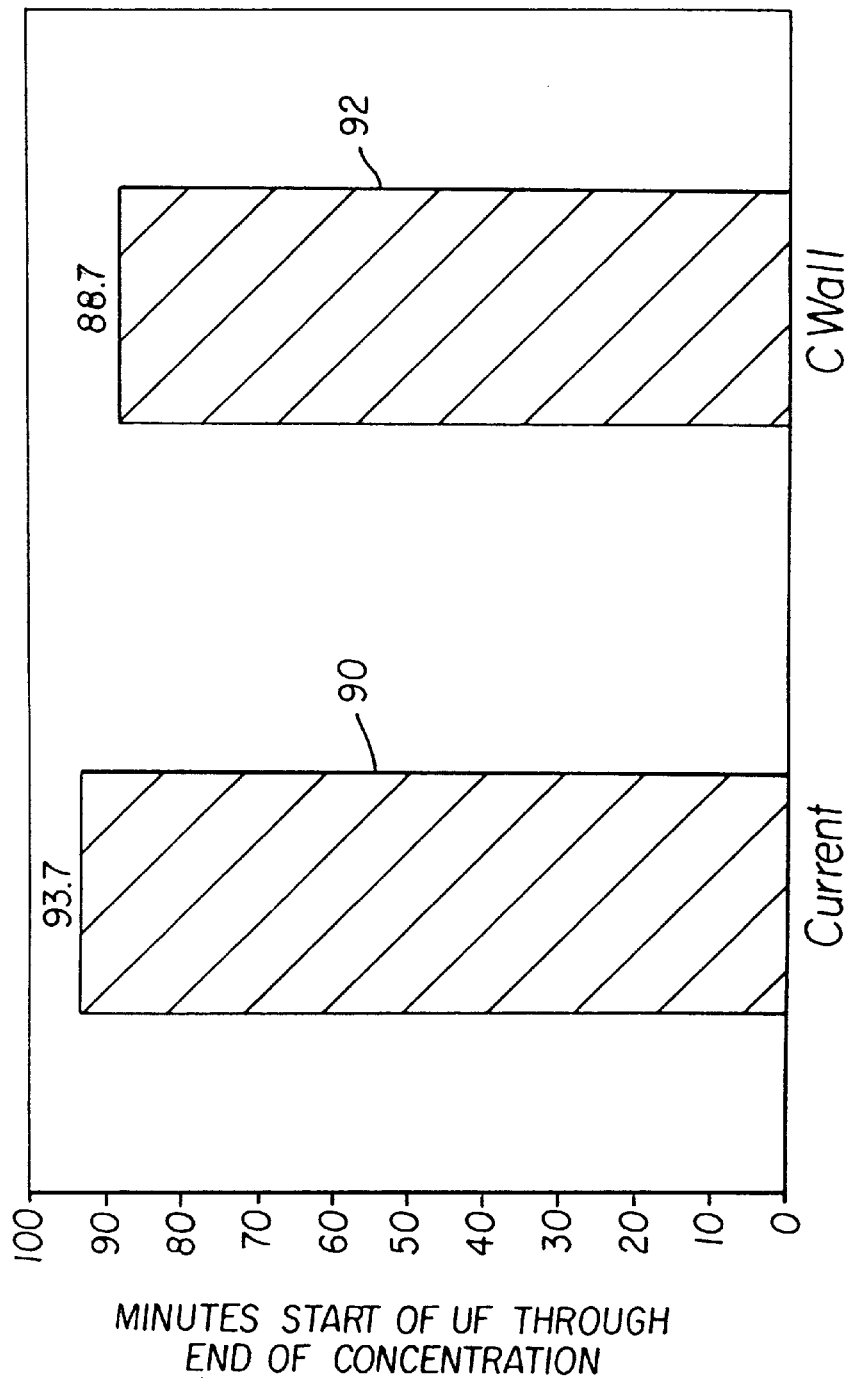
FIG. 6 compares the process time between the process of the present invention and prior art.

The result is a reduction in the residual silver in mg/ft² on the UF membrane for $1^{st}$ batches of emulsion. Process time is basically unaffected with proper optimization (see FIG. 6). Bar 90 represents the process time for the prior art process. Bar 92 represents the process time for the process of the present invention.

It is possible to estimate the yield improvement using the residual silver measurement on the membrane, the total square footage of UF membrane and the batch size using the equation:

$$RAG*TA*MW=SU$$

where

RAG=Residual silver on UF membrane in Mg silver/ft sq. membrane

TA=Total area of UF membranes in sq. ft.

MW=molecular weight of silver in Mg

SU=recovered moles silver

Figure 8:
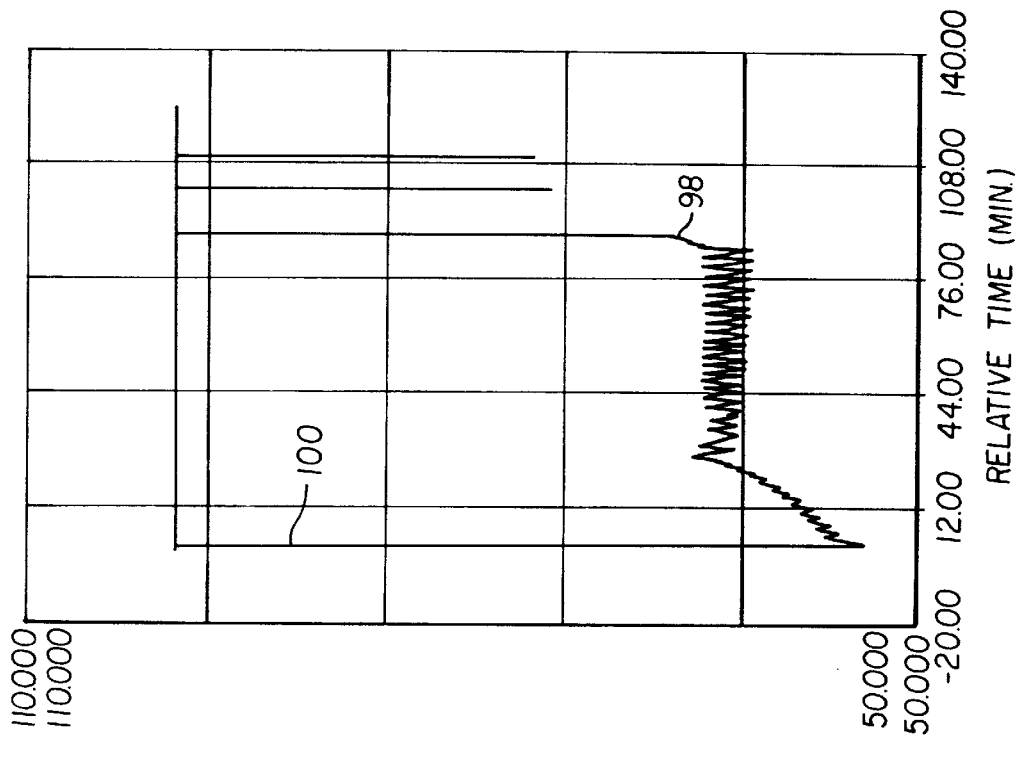
FIG. 8 compares feed back-pressure control valve between the prior art and $C_{wall}$ process of the present invention.
Figure 7:
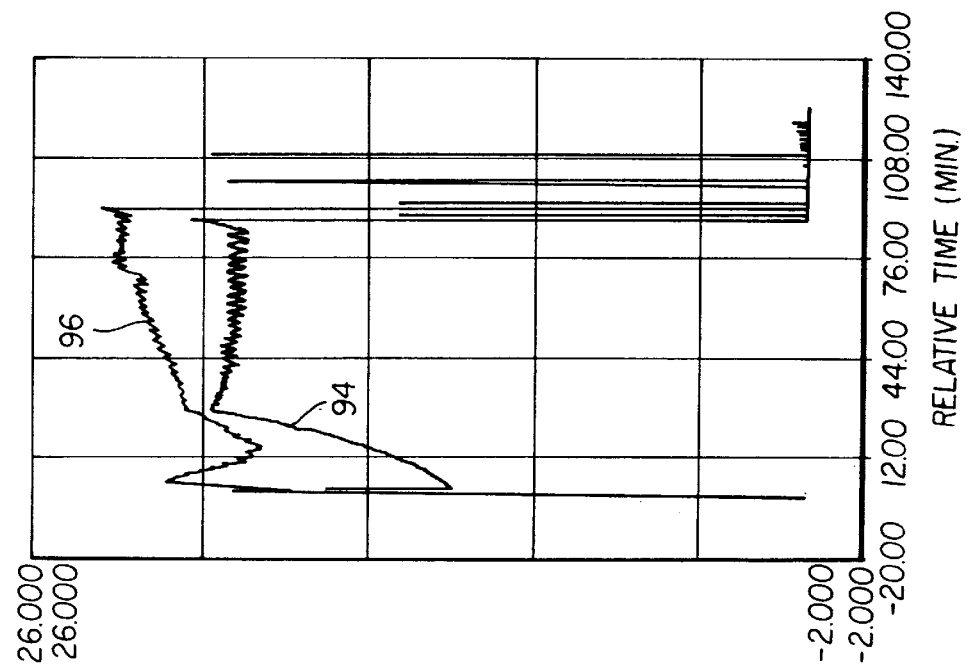
FIG. 7 compares feed flow for the prior art and $C_{wall}$ process of the present invention.
Figure 9:
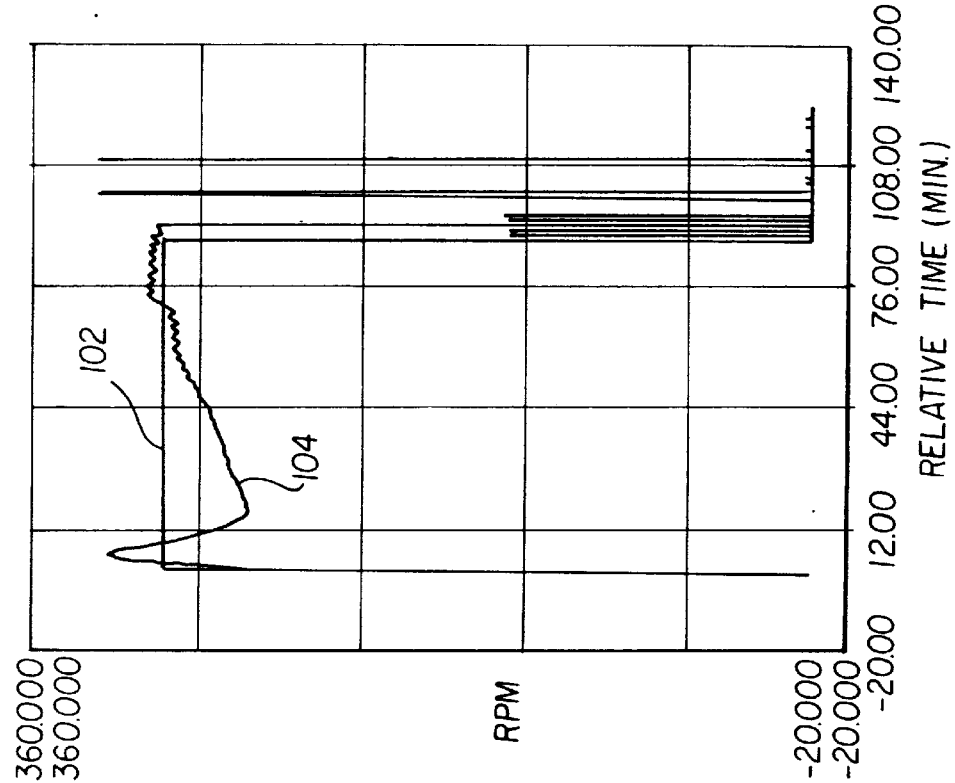
FIG. 9 compares the feed pump speed between the $C_{wall}$ of the present invention and prior art.

Some distinct process changes will be evident during use of $C_{wall}$ Process Control. Feed flow will be initially lower. Feed flow (l/min) is plotted over time for the prior art process and the $C_{wall}$ process of the present invention in FIG. 7. Graph line 94 represents the prior art process and graph line 96 represents the process of the present invention. Feed flow will be increased throughout the later approximately two-thirds of the process. Whereas, a backpressure control valve is always used during TMP Process Control, control valve 32 is frequently not used at all during operation of the $C_{wall}$ process of the present invention (see FIG. 8). FIG. 8 plots percent closed of control about 32 for both the prior art process (TMP) and the process of the present invention over time. Graph line 98 represents the prior art process and graph line 100 represents the process of the present invention. During TMP, the feed pump ramps to the setpoint (250 RPM, 300 RPM or 350 RPM) and holds at that setpoint throughout the process unless a rampdown occurs during the final concentration. During operation of the $C_{wall}$ process, the pump speed ramps similarly, but varies to deliver the $C_{wall}$ setpoint. This is illustrated in FIG. 9, which plots pump speed (rpm) over time. Graph line 102 represents the prior art (TMP) process and graph line 104 represents the process of the present invention.

Figure 10:
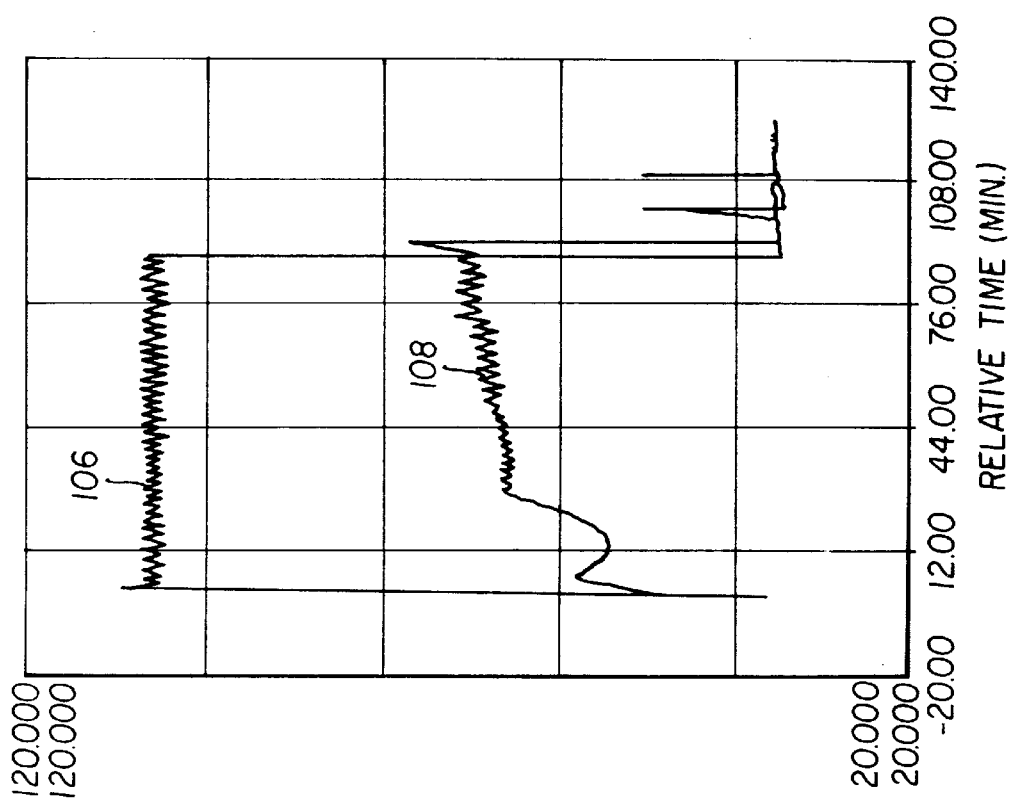
FIG. 10 compares feed back-pressure from the prior art and $C_{wall}$ process of the present invention wherein the Y axis represents the inlet pressure of the tube in psi.

During TMP Process Control, the feed inlet pressure ramps (represented by graph line 106) to the 125 psi (p Scale) setpoint and remains there throughout the process. During the $C_{wall}$ process, the inlet pressure (represented by graph line 108) is lower and varies to deliver the $C_{wall}$ setpoint (see FIG. 10).

During TMP Process Control, the feed inlet pressure/feed outlet pressure differential is less than the $C_{wall}$ feed inlet pressure/feed outlet pressure differential. This results in the higher feed flow for the $C_{wall}$ process which "sweeps" the emulsion off the UF membranes.

EXAMPLES

Figure 11:
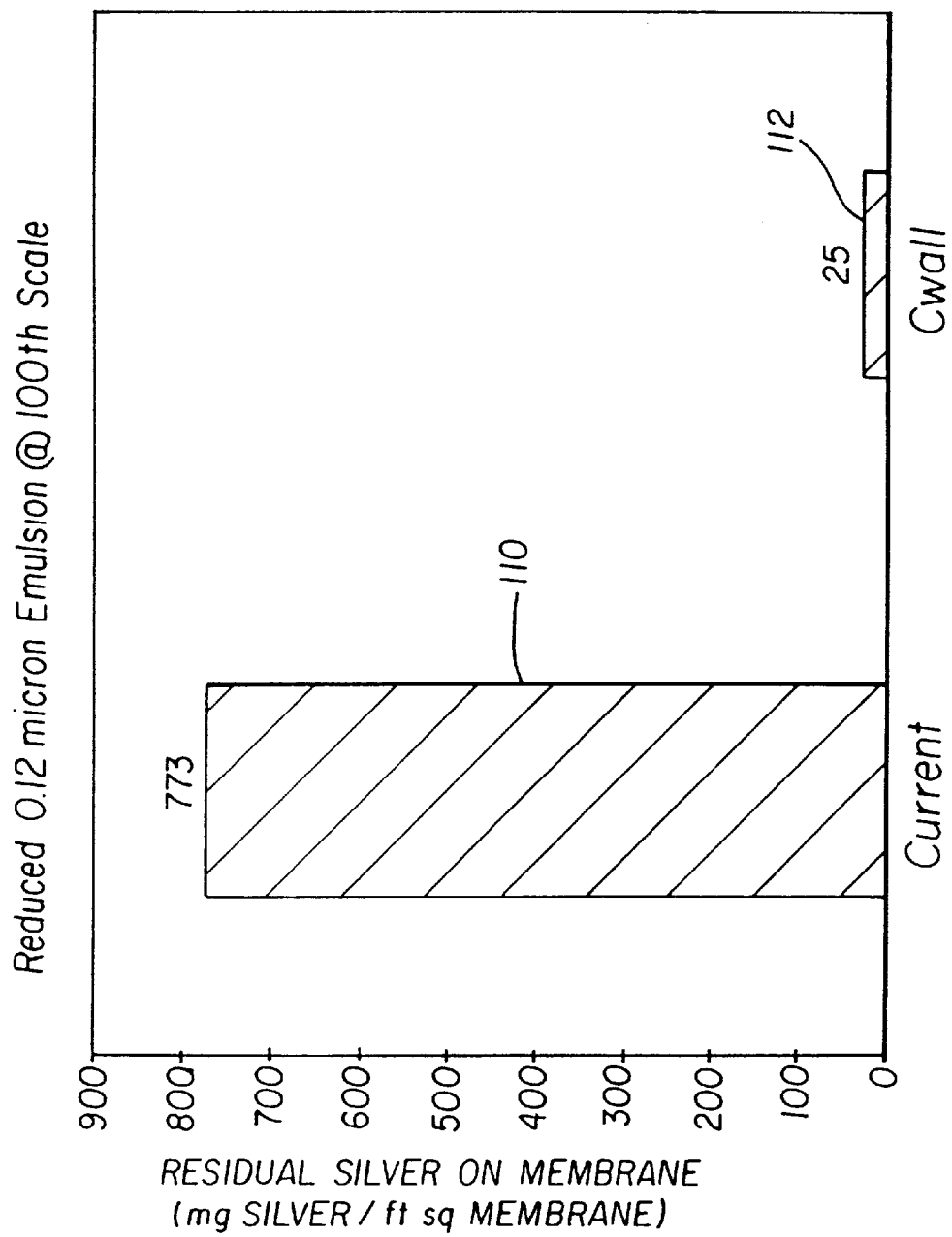
FIG. 11 shows a reduction in residual silver on a UF membrane using the process of the present invention over prior art processes for a feed of average particle diameter of 0.12 micron.

The following are the results of two trials of the use of $C_{wall}$ Process control. In FIG. 11, reduction in residual silver on the UF membrane is seen for a 0.12 micron emulsion. Bar 110 represents the residual silver for the process of the prior art (TMP) and bar 112 represents the residual silver for the $C_{wall}$ process of the present invention.

The resulting reduced use of the feed pump 16 (FIG. 9), reduced pressure (FIG. 10), and reduced use of the feed flow backpressure control valve (FIG. 8) are illustrated. The resulting increased feed flowrate (FIG. 7) essentially sweeps the emulsion away from the membrane reducing the concentration polarization layer.

Figure 12:
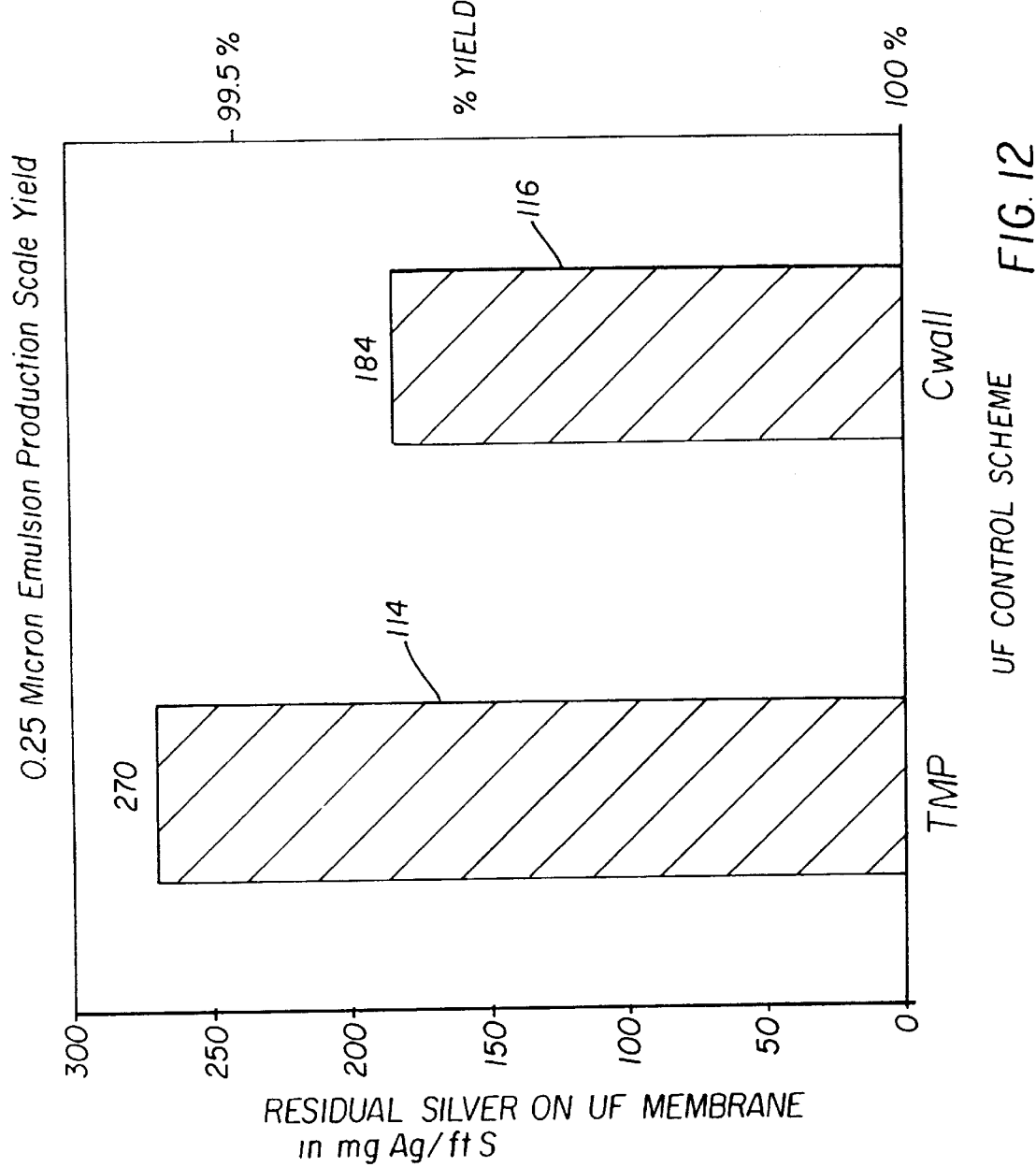
FIG. 12 shows residual silver comparison between $C_{wall}$ process of the present invention and prior art for a feed of average particle diameter of 0.25 micron.
Figure 13:
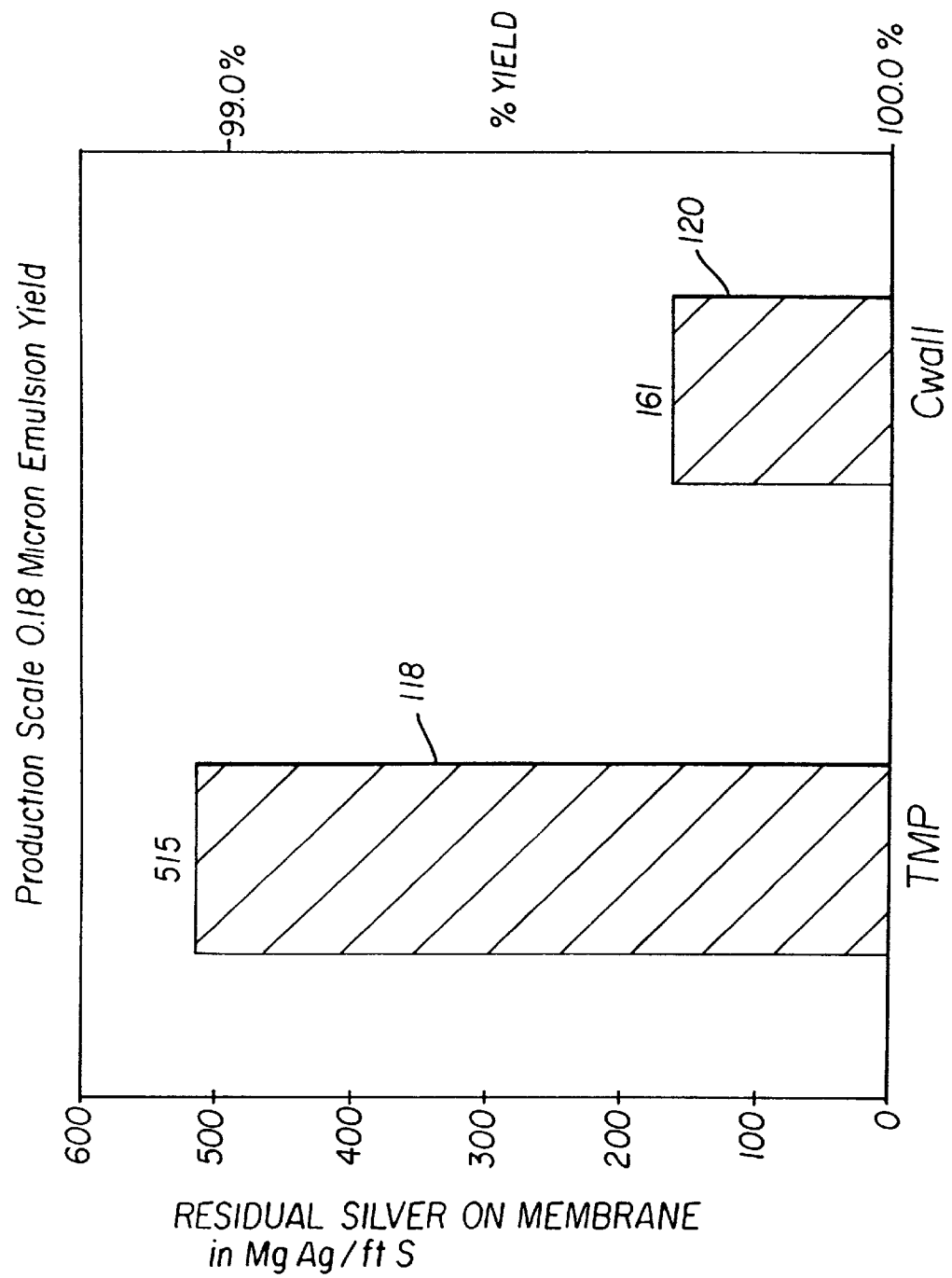
FIG. 13 shows residual silver comparison between $C_{wall}$ process of the present invention and prior art for a feed of average particle diameter of 0.18 micron.

Two additional examples of production batch reduction in feed loss on the membrane are shown in FIG. 12 (0.25 micron feed) and FIG. 13 (0.18 micron feed). In FIG. 12, bar 114 represents residual silver in the prior art process and bar 116 represents residual silver in the process of the present invention. In FIG. 13, bar 118 represents residual silver in the prior art process and bar 120 represents residual silver in the process of the present invention.

The invention has been described in detail with particular reference to certain preferred embodiments thereof, but it will be understood that variations and modifications can be effected within the spirit and scope of the invention.

PARTS LIST 10 reaction vessel
12 conduit
14 mixer
16 pump
18 conduit
20 three-way valve
22 permeator
24 inlet pressure sensor
26 next batch process
28 concentrate line
30 outlet pressure sensor
32 back pressure control valve
34 valve
35 conductivity probe
36 permeate conduit
38 permeate flowmeter
40 level sensor
41 high purity water supply

What is claimed is:

1. A process for concentrating, separating and purifying photographic emulsions from mixtures including impurities using a spiral wound UF membrane comprising the steps of:
    (a) determining the constant concentration of gelatin at the spiral wound UF membrane wall;
    (b) determining a mass transfer coefficient of the photographic emulsion;
    (c) prescribing a wash conductivity endpoint and prescribing emulsion concentration endpoints;
    (d) circulating photographic emulsion from a reaction vessel through the spiral wound UF membrane at a constant gelatin concentration at the wall of the spiral wound UF membrane using a feed pump; and
    (e) updating a permeate flowrate from the spiral wound UF membrane, the speed of the feed pump, and the inlet pressure and outlet pressure of the spiral wound UF membrane as the volume decreases in the reaction vessel to achieve the constant concentration of gelatin at the spiral wound UF membrane wall until the wash conductivity and concentration endpoints are reached.

2. A process as recited in claim 1 further comprising the step of:
    controlling the operation of said process by maintaining the constant concentration of gelatin at the UF membrane wall as determined in said determining step.

3. A process as recited in claim 2 wherein:
    said controlling step is performed using the equation $$PFR = kLN\ (C_{wall}/C_{bulk})$$

where
    PFR=Permeate flow rate in L/m² hr
    k=mass transfer coefficient in L/m² hr
    $C_{wall}$=Concentration of gel at wall of membrane in wgt/vol % gel
    $C_{bulk}$=Concentration of gel in bulk solution in wgt/vol %=VoCo/V
    Vo=volume at time=0 in L
    V=volume at time=t in L
    Co=concentration of gel at time=0 in wgt/vol %.

4. A process as recited in claim 3 further comprising the step of:
    adjusting the feed pump speed and inlet pressure and outlet pressure of the spiral wound UF membrane in order to deliver the permeate flowrate determined by the equation to achieve the constant $C_{wall}$ setpoint.

5. A process for concentrating, separating, and purifying photographic emulsions from mixtures including impurities using a spiral wound UP membrane comprising the steps of:
    (a) determining the constant concentration of gelatin at the spiral wound UF membrane wall;
    (b) determining a mass transfer coefficient of the photographic emulsion;
    (c) prescribing a wash conductivity endpoint and prescribing emulsion concentration endpoints;
    (d) circulating photographic emulsion from a reaction vessel through the spiral wound UF membrane at a constant gelatin concentration at the wall of the spiral wound UF membrane; and (e) maintaining the constant concentration of gelatin at the spiral wound UF membrane wall until the wash conductivity and concentration endpoints are reached by controlling a variable permeate flowrate from the spiral wound UF membrane as the volume decreases in the reaction vessel.

6. A process as recited in claim 2 wherein:

said maintaining and controlling step is performed using the equation $$PFR = k \operatorname{LN}(C_{wall}/C_{bulk})$$

where

PPR=Permeate flow rate in $L/m^2$ hr k=mass transfer coefficient in $L/m^2$ hr $C_{wall}$=Concentration of gel at wall of membrane in wgt/vol % gel $C_{bulk}$=Concentration of gel in bulk solution in wgt/vol %=VoCo/V Vo=volume at time=0 in L V=volume at time=t in L Co=concentration of gel at time=0 in wgt/vol %.

* * * * *